United States Patent [19]

Welles II et al.

[11] Patent Number: 4,972,358

[45] Date of Patent: Nov. 20, 1990

[54] COMPUTATION OF DISCRETE FOURIER TRANSFORM USING RECURSIVE TECHNIQUES

[75] Inventors: Kenneth B. Welles II, Scotia; Richard I. Hartley, Schenectady, both of N.Y.

[73] Assignee: General Electric Company, Schenectady, N.Y.

[21] Appl. No.: 363,238

[22] Filed: Jun. 8, 1989

[51] Int. Cl.[5] ............................................. G06F 15/31
[52] U.S. Cl. .................................................. 364/726
[58] Field of Search .............................. 364/726, 725

[56] References Cited

U.S. PATENT DOCUMENTS

| | | |
|---|---|---|
| 4,689,762 | 8/1987 | Thibodeau, Jr. ..................... 364/726 |
| 4,760,549 | 7/1988 | du Chene et al. ................... 364/726 |
| 4,787,055 | 11/1988 | Bergeon et al. ..................... 364/726 |
| 4,791,590 | 12/1988 | Ku et al. ............................... 364/726 |
| 4,831,570 | 5/1989 | Abiko ............................... 364/726 X |

OTHER PUBLICATIONS

"A Mathematical Approach to Modeling the Flow of Data & Control in Computational Networks", L. Johnsson & D. Cohen, *VLSI Systems & Computations*, H. T. Kung et al., pp. 213-225, Computer Science Press Rockville, MD. 1981.

L. R. Rabiner & B. Gold, *Theory and Application of Digital Signal Processing*, Prentice Hall, Englewood Cliffs, NJ, pp. 50–57.

F. J. Harris, "On the Use of Windows for Harmonic Analysis with the Discrete Fourier Transform", Proceedings of the IEEE, vol. 66, No. 1, Jan. 1978, pp. 51–83.

*Primary Examiner*—Dale M. Shaw
*Assistant Examiner*—Tan V. Mai
*Attorney, Agent, or Firm*—Allen L. Limberg; James C. Davis, Jr.; Marvin Snyder

[57] ABSTRACT

The discrete Fourier transform is continuously calculated at input signal sample rate using recursive filtering, rather than transversal filtering. This reduces the number of complex digital multiplications per computational cycle to N, the number of spectral components in the discrete Fourier transform, where rectangular truncation window or a new exponential window is used. Where a triangular truncation window is used the number of complex digital multiplications per computational cycle is reduced to 2N.

18 Claims, 12 Drawing Sheets

COMPUTATION OF DISCRETE FOURIER TRANSFORM USING RECURSIVE TECHNIQUES

The present invention relates to computation by digital computer of the discrete Fourier transform (DFT), as may be done for computing power spectra in ultrasound diagnostic equipment, for example.

BACKGROUND OF THE INVENTION

In medical ultrasound, many diagnostic procedures begin from the determination of the power spectrum of the returning signal. Certain of these diagnostic procedures can provide better diagnostic precision if the power spectrum can be derived at the same sampling rate as that of the incoming signal. Attempting to do this real-time spectral analysis with a dedicated computer using known fast Fourier transform procedures has previously been inordinately expensive in terms of digital hardware and of the power consumption by that hardware, when attempting to meet speed requirements. Accordingly, the development of more refined medical diagnoses using ultrasound has been hampered.

The reader is referred to the text THE FAST FOURIER TRANSFORM by E. Oran Brigham, copyright 1974 by Prentice Hall, Inc.., Englewood Cliffs, N.J. The first five chapters of this book describe the continuous Fourier transform and its various properties.

The continuous Fourier transform of a repetitive function in the time domain (repeating at $T_0$ intervals) comprises a spectrum of discrete frequencies that are harmonics of the repetition frequency $F_0 = T_0^{-1}$ and have both real and imaginary components, one of which components may be zero-valued. As described by Brigham in Chapter 6 of his book, a discrete Fourier transform can be generated, which approximates the continuous Fourier transform and facilitate calculation by computer Brigham in subchapter 6–2 indicates that the discrete Fourier transform $G(nN/t)$ of a function $g(kt)$ sampled periodically in time T can be defined as follows.

$$G(n/NT) = \sum_{k=0}^{N-1} g(kT)\exp(-j2\pi nk/N) \quad n = 0, 1, \ldots, (N-1) \quad (1)$$

Note the above definition describes the computation of N equations for describing the N time samples and the N spectral values in one period $F_0$ of the frequency domain respectively.

If these N equations are arranged in matrix format replacing $\exp(-j2\pi/N)$ with the complex number W, it appears at first as if $N^2$ complex multiplications and $N(N-1)$ complex additions are necessary for carrying out computation. It has been found that where N is a power of two, the total number of multiplications can be reduced to $N \log_2 N$ by taking advantage of the fact that certain powers of W are equal to others to allow factoring the large square matrix in powers on W into the product of smaller matrices, after some juggling of the order of its rows and columns. Since the complexity of the computation of the matrix equation is primarily dependent on the number of multiplications, these factoring processes can serve as the basis for computations of discrete Fourier transform that are more efficient overall. These computations are commonly referred to as the "fast Fourier transform" or "FFT".

The computational processes for discrete Fourier transform that are known in the prior art may be characterized as being finite-impulse-response (FIR) digital filtering processes, it is here pointed out FIR digital time-domain filtering processes are ones in which the response to an impulse input actually becomes zero-valued in a finite time interval. In the prior art discrete Fourier transform calculations the truncation interval forms a low-pass filtering kernel of finite width and imposes FIR characteristics on the transform results.

A characteristic of an FIR digital filtering process is that a filter kernel must be applied to each input signal sample. Accordingly, almost invariably FIR filtering is done on a non-recursive basis using a tapped-delay-line structure sometime referred to as a transversal filter. Using such non-recursive filtering to achieve a continuous filter response entails many multiplications. In calculating discrete Fourier transforms in accordance with the prior art, this same requirement that all multiplications must be made respective to each input signal sample obtains, presuming it is attempted to generate the discrete Fourier transform at the same rate F as input signal samples are supplied—that is, with truncation interval continuously sliding in time. To keep the number of multiplications per time period within practical bounds, however, the custom is to step the truncation interval N input signal samples at a time and to calculate the discrete Fourier transform at rate F/N.

Another class of digital time-domain filtering processes that is generally known may be characterized as being infinite impulse response (IIR) character IIR time-domain filtering processes are ones in which the response to an impulse input extends over an infinitude of positive time. While response may diminish to negligible values in extended time, theoretically it never actually goes to zero. IIR filter characteristics normally obtain when recursive filtering processes take place.

Recursive digital filtering uses the previous filter output signal value(s) in computing the current response to an input signal. Recursive digital filtering can reduce the number of digital multiplications required to accomplish many filtering tasks, and this is generally the reason for their use. Recursive digital filters with IIR characteristics have an impulse response that is asymmetric in the time domain, which is commonly viewed as being disadvantageous.

SUMMARY OF THE INVENTION

The discrete Fourier transform is calculated continuously by recursive filtering. In certain embodiments of the invention FIR truncation windows are employed, but the discrete Fourier transform is nevertheless obtained by recursive filtering, rather than by transversal filtering. In other embodiments of the invention IIR truncation windows are employed.

In preferred embodiments of the invention an IIR truncation window exponentially decaying in the frequency domain is used to eliminate the need for memory in connection with providing a truncation window for the calculations. Each successive set of N spectrum components forming a respective transform is generated by no more than N further digital multiplications using this exponential window Each successive set of N spectral components generated in accordance with the invention, but using a rectangular window, also needs no more than N further complex digital multiplications; and each successive set of N spectral components generated in accordance with the invention, but using a triangular window needs no more than 2N further complex digital multiplications.

Figure 2:
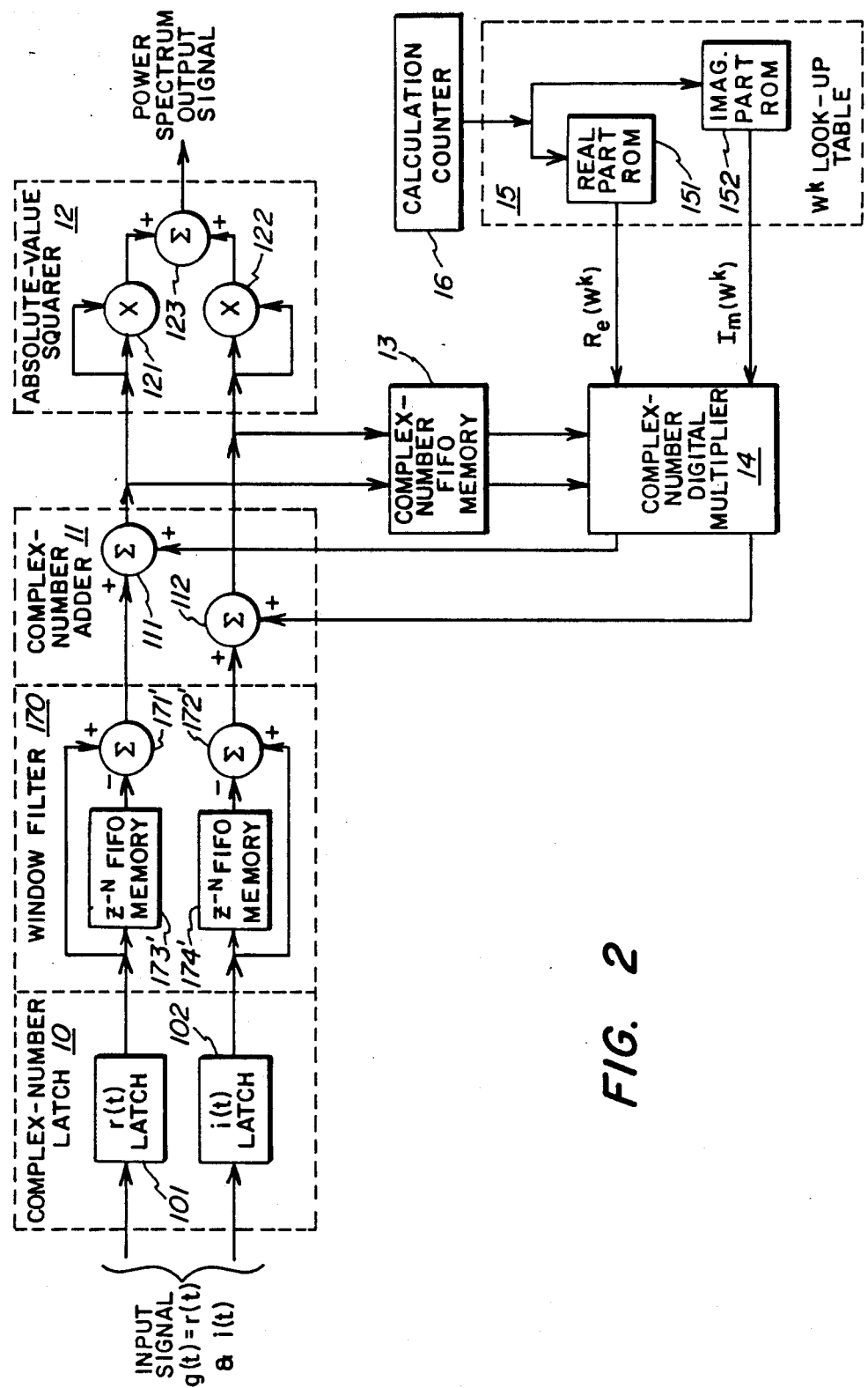
Figure 3:
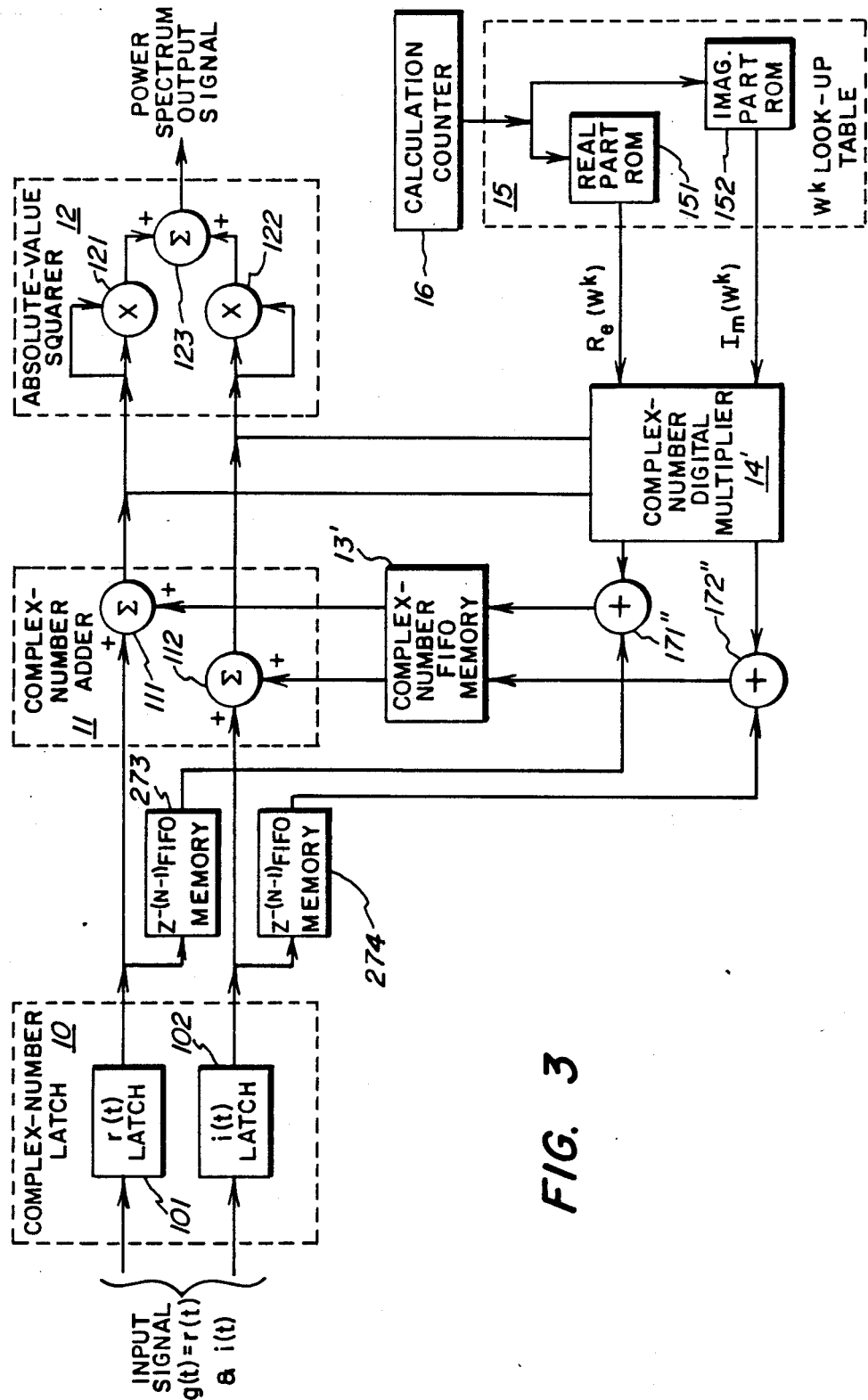

Each of FIGS. 2 and 3 is a schematic diagram of an alternative power spectrum analyzer embodying the invention and sequentially calculating DFT using a rectangular truncation window.

Figure 4A:
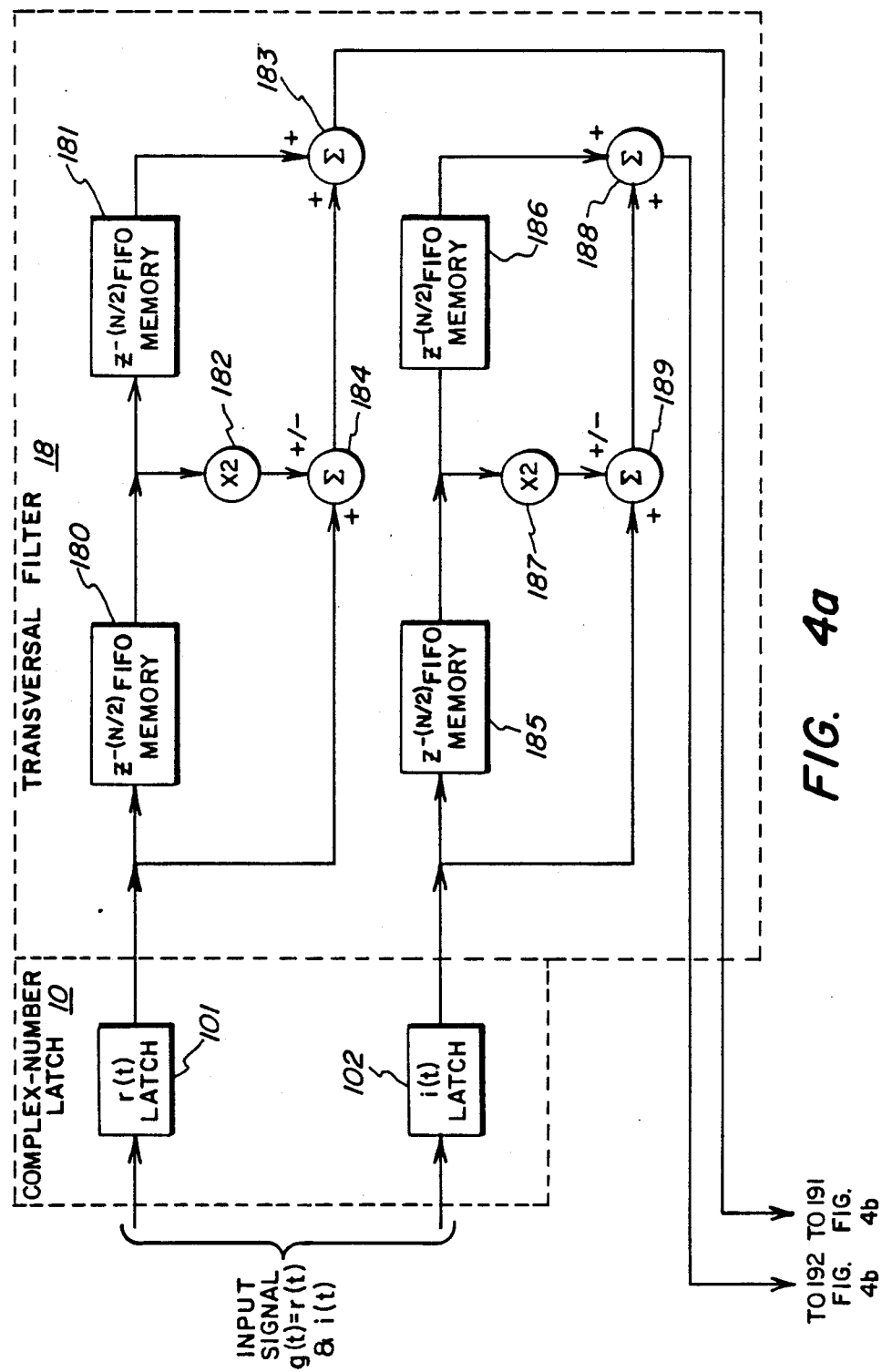
Figure 4B:
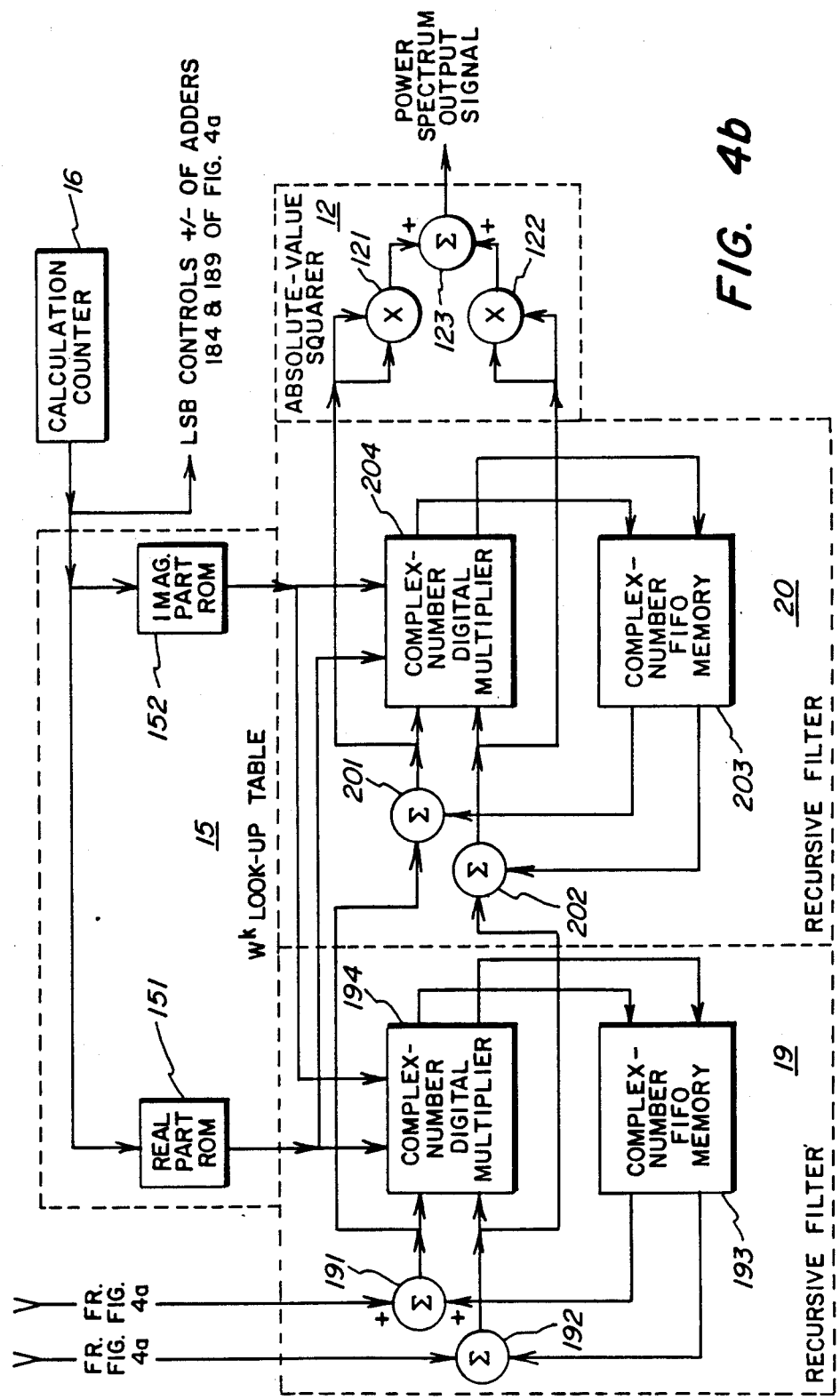

FIGS. 4a–4b is a schematic diagram of an alternative power spectrum analyzer embodying the invention and sequentially calculating DFT using a triangular truncation window.

Figure 5:
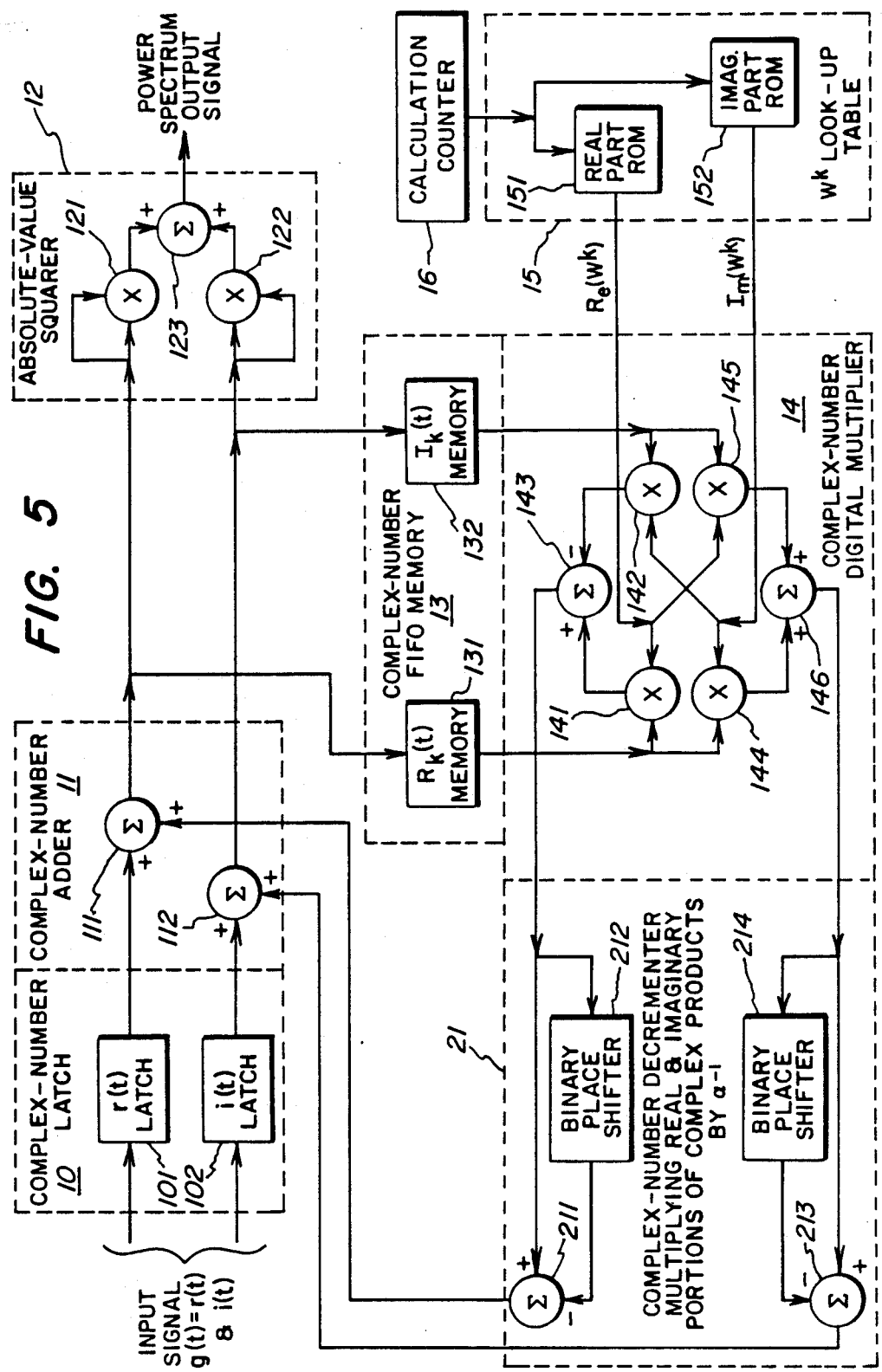

FIG. 5 is a schematic diagram of another power spectrum analyzer embodying the invention in a preferred form and sequentially calculating discrete Fourier transform using an exponentially decaying truncation window or "exponential window".

Figure 6:
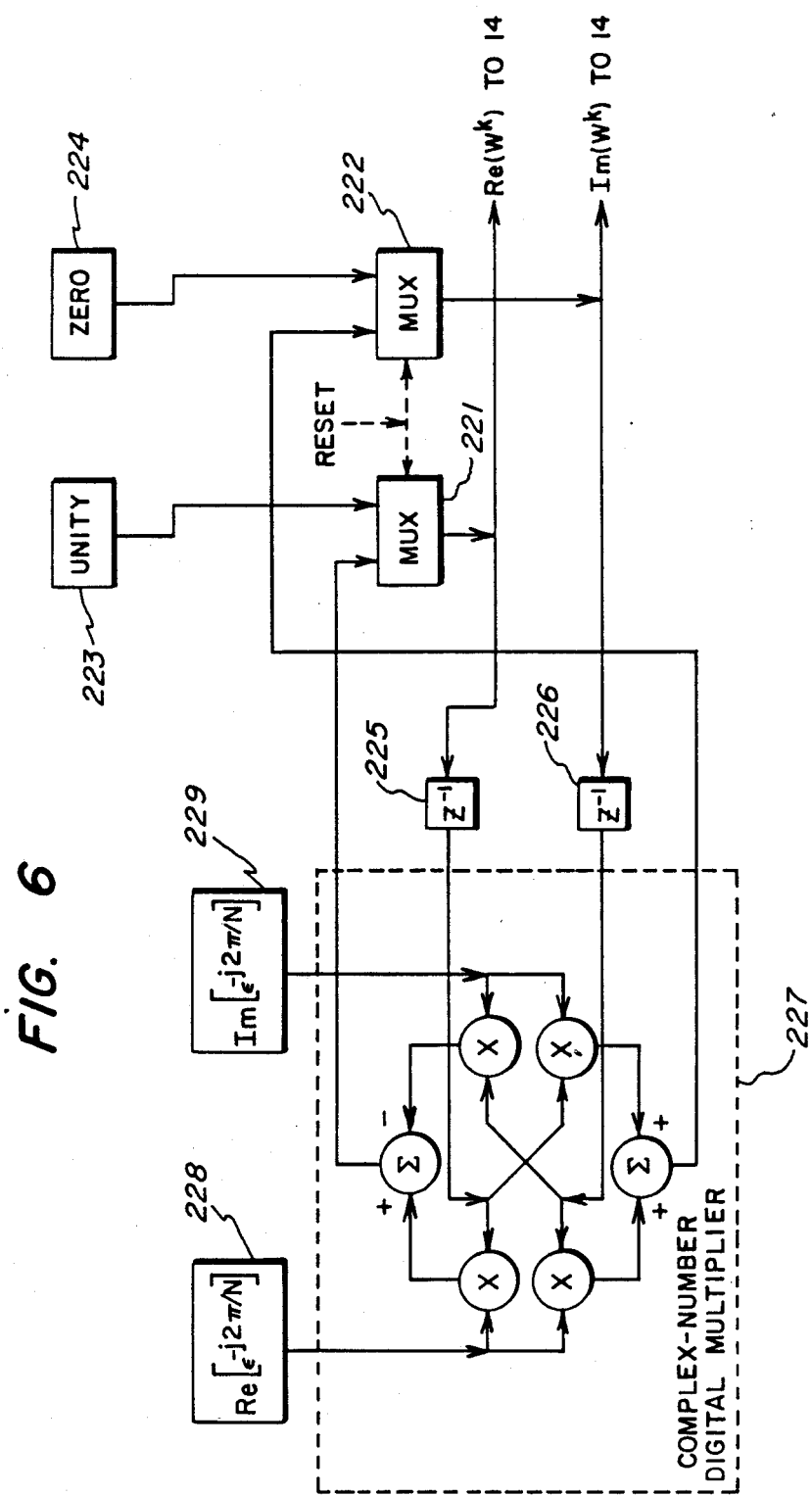

FIG. 6 is a schematic diagram of a modification in which $W^k$ values are calculated rather than taken from look-up tables in read-only memory, which modification can be made to any of the power spectrum analyzers of the previous figures to provide alternative embodiments of the invention.

Figure 7:
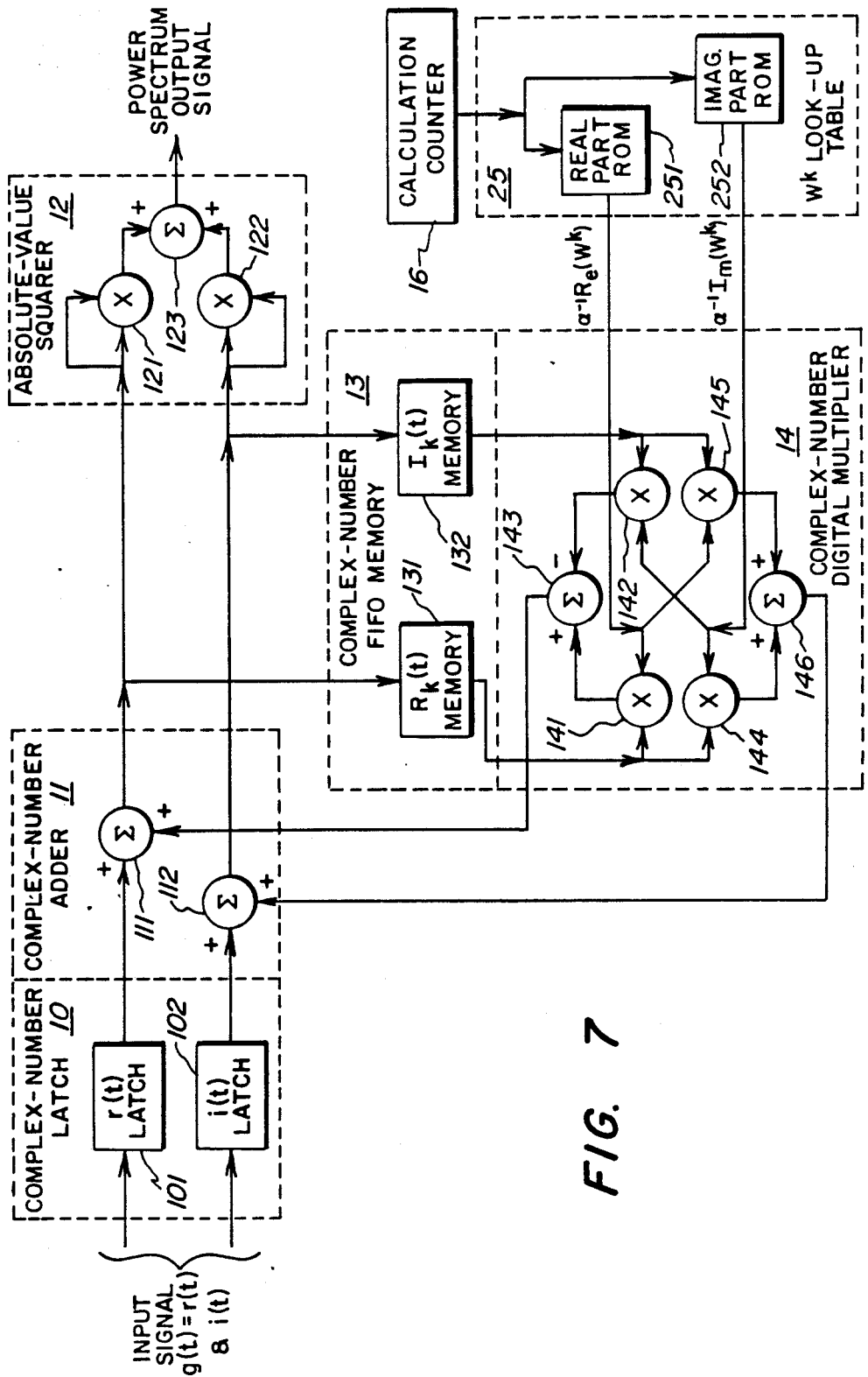
Figure 8:
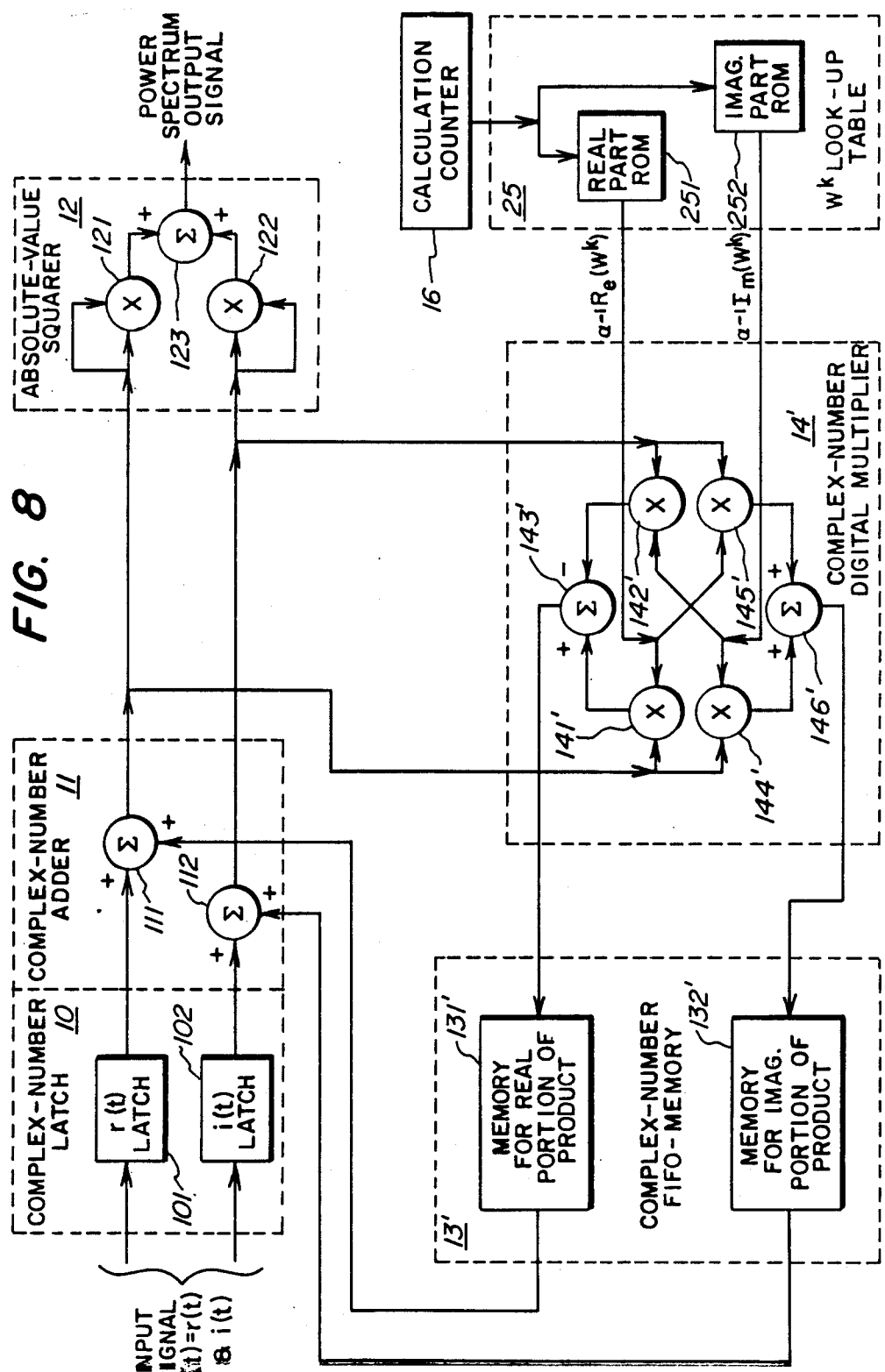

FIGS. 7 and 8 are schematic diagram of other power spectrum analyzers embodying the invention, using an exponential window, and calculating power spectrum values sequentially.

Figure 9:
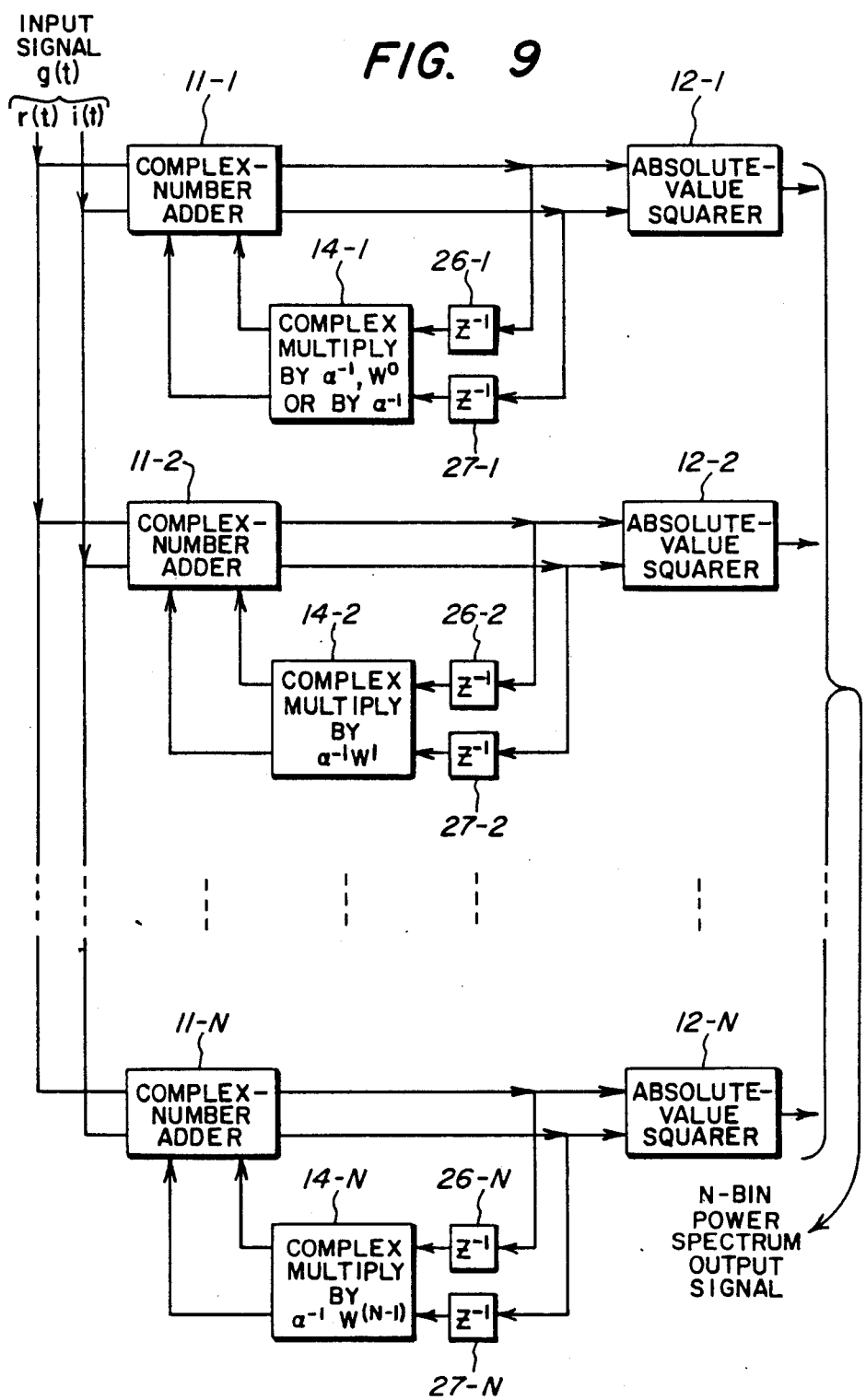
Figure 10:
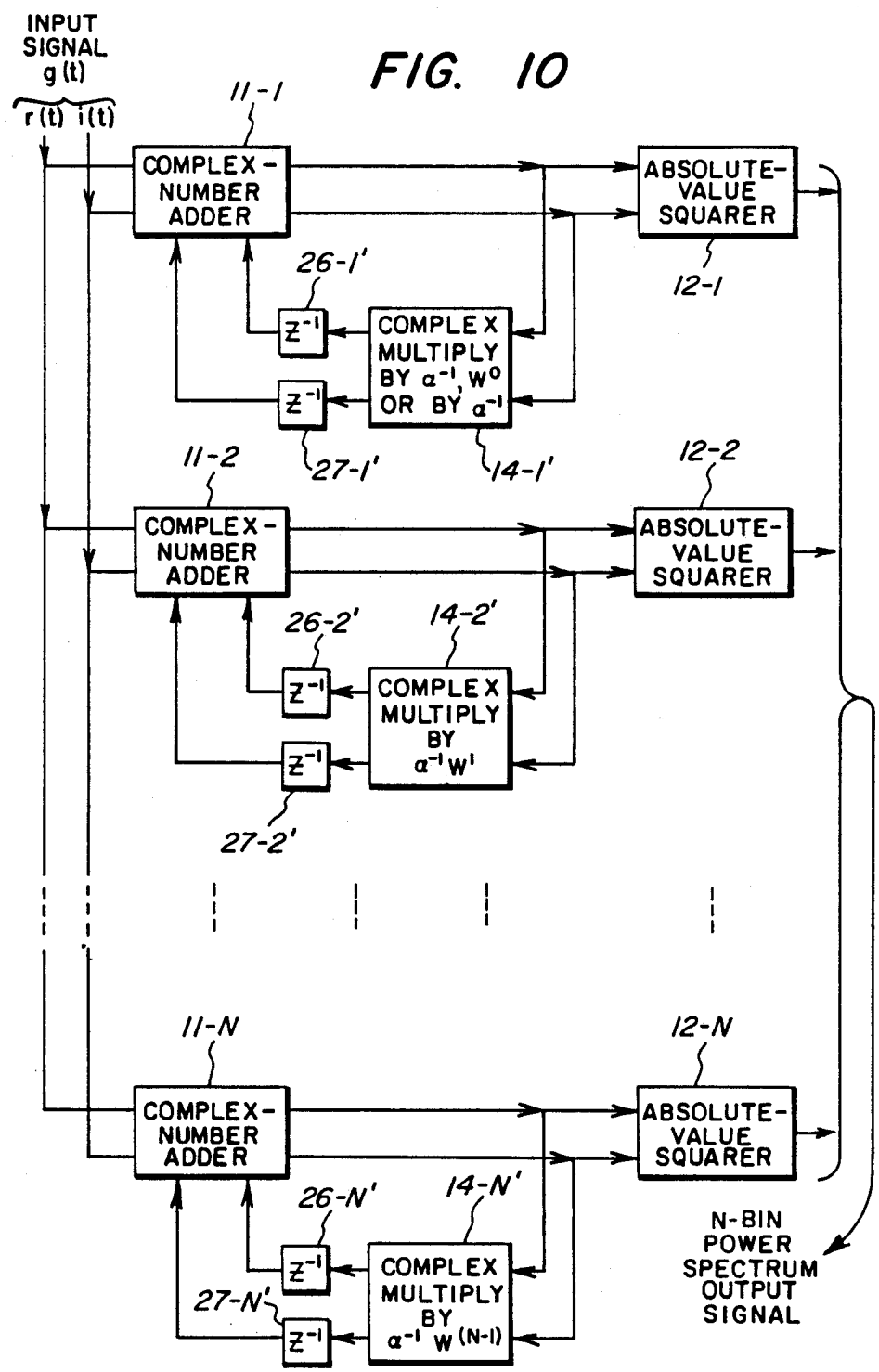

FIGS. 9 and 10 are schematic diagrams of power spectrum analyzers embodying the invention and using an exponential window, which analyzers calculate the power spectrum values in parallel, rather than sequentially as in the spectrum analyzers of the previous figures.

Figure 11:
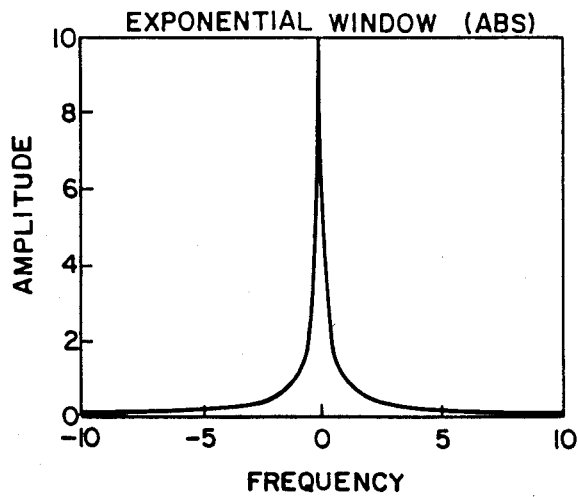
Figure 12:
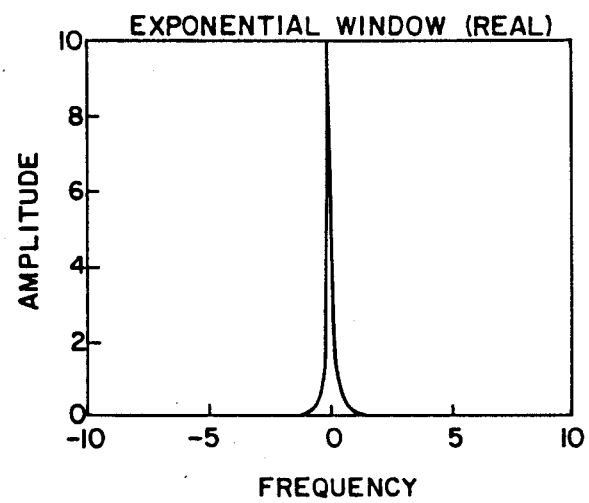
Figure 13:
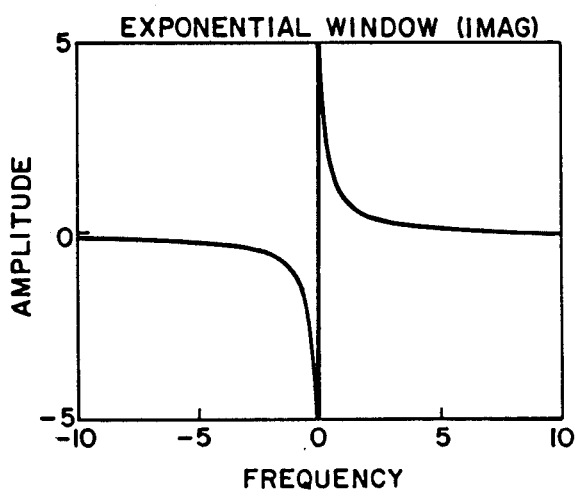

FIGS. 11, 12 and 13 are graphs of the amplitude responses of the continuous Fourier transform of the exponential window, its real part and its imaginary part, respectively.

DETAILED DESCRIPTION

Given a sequence of real or complex values, g(i), and a window function H(i) extending over the range $-\infty \leq i \leq \infty$ define the windowed discrete Fourier transform at time to be as follows:

$$G_t(k) = G(k,t) = W^{tk} \sum_{i=-\infty}^{\infty} g(i)H(i-t)W^{ik} \quad (2)$$

where t is time in discrete time intervals separated by $T_o$ and where $W$ is the primitive Nth root of unity, $W = \exp(-j2\pi/N)$. The index k ranges from 0 to N−1 and t ranges from $-\infty$ to $\infty$. Normally, the window function H(i) will satisfy H(i)=0 for i>0, so that at any time t, $G_t(k)$ is computed from current and previous values of g(i). $G_t(k)$ may be thought of as the result of sliding the window over the sequence g(i) and forming the infinite sum.

Now, defining H(i) by H(i)=H(−i), assuming that H(i)=0 for i>0, and replacing the index i by (t−i), equation (2) may be rewritten as follows:

$$G(k,t) = \sum_{i=0}^{\infty} g(t-i)H(i)W^{ik} \quad (3)$$

An important window is the rectangular window defined as follows:

$$H(i) = 1 \text{ for } 0 \leq i < N$$
$$= 0 \text{ otherwise.}$$

With this window, the equation (3) becomes equation (4), following:

$$G(k,t) = \sum_{i=0}^{N-1} g(t-i)W^{ik} \quad (4)$$

G(k,t) may be computed recursively. Equation (5) following is obtained from equation (4) by substituting (t+1) for t.

$$G(k,t+1) = \sum_{i=0}^{N-1} g(t+1-i)W^{ik} \quad (5)$$

Replacing index i by (i+1), equation (6) is obtained:

$$\begin{aligned} G(k,t+1) &= \sum_{i=-1}^{N-2} g(t-i)W^{(i+1)k} \\ &= W^k \sum_{i=-1}^{N-2} g(t-i)W^{ik} \\ &= W^k\{G(k,t) + g(t+1)W^{-k} - g[t-(N-1)]W^{-k}\} \\ &= W^k G(k,t) + g(t+1) - g(t+1-N) \end{aligned} \quad (6)$$

Thus, the new value G(k,t+1) may be simply computed by multiplying the previous value by $W^k$, adding the new input value g(t+1) and subtracting a previous value taken from memory.

L. R. Rabiner & B. Gold in subchapter 2.21 "The Discrete Fourier Transform" on pages 50–57 of their book *Theory and Application of Digital Signal Processing*, copyright 1975, published by Prentice-Hall, Inc. of Englewood Cliffs, N.J., note that the discrete Fourier transform of a finite duration sequence is a spectrum of the values of the z transform of that same sequence at N evenly spaced points around the unit circle in the z-transform plane. Rabiner and Gold indicate that this relationship can be used to develop z-transform results from discrete Fourier transform coefficients.

Those familiar with the discrete Fourier transform know in a general way that it can be viewed as the equivalent of N FIR band-pass filters, one for each frequency spectrum bin. The relationship between the discrete Fourier transform and the z transform can be exploited in the opposite way from that described by Rabiner and Gold, so that the discrete Fourier transform can be calculated continuously using sampled-data filters.

By making each of these N filters recursive in nature, the inventors point out, the number of multiplications per successive filtering step can be made to be one in many cases, or at most a positive integer substantially smaller than N. This contrasts with these N filters being transversal in nature, as usually associated with FIR filtering, which requires substantially N multiplications per filter.

It is instructive to deduce (6) using filter techniques, namely the z-transform. This method relies on the following basic fact, hereinafter called "the definition of a filter in the z domain".

DEFINITION: The filter with response $$y(t) = \sum_{i=0}^{n} a_i x(t-i) - \sum_{i=1}^{m} b_i y(t-i)$$

has transfer function in the z-domain given by $$\left(\sum_{i=0}^{n} a_i z^{-i}\right) / \left(1 + \sum_{i=1}^{m} b_i z^{-i}\right)$$

where x is the input of the filter, y is the output.

Equation (4) is rewritten as equation (7) using the notation $G_k(t)$ instead of $G(k,t)$ or $G_t(k)$.

$$G_k(t) = \sum_{i=0}^{N-1} g(t-i) W^{ik} \quad (7)$$

One may note that for each k, equation (7) is the equation for a filter. Applying the previously established definition of a filter with $g(t-i)$ taking the place of $x(t-i)$ and $G_k(t-i)$ taking the place of $y(t-i)$, one may note that equation (7) is the equation for a filter with transfer function as follows:

$$\sum_{i=0}^{N-1} W^{ik} z^{-i} = 1 + W^k z^{-1} + W^{2k} z^{-2} + \ldots + W^{(N-1)k} z^{-(N-1)} \quad (8)$$

Evaluating the power series by known reduction formula and remembering $W^{NK}=1$, the transfer function in equation (8) may be further reduced as follows:

$$\sum_{i=0}^{N-1} W^{ik} z^{-i} = \frac{1 - W^{Nk} z^{-N}}{1 - W^k z^{-1}} = \frac{1 - z^{-N}}{1 - W^k z^{-1}} \quad (9)$$

Equation (9), according to the definition of a filter in the z domain, is the transfer function for the filter defined as follows:

$$G_k(t) = g(t) - g(t-N) + W^k G_k(t-1) \quad (10)$$

Equation (10) is (essentially) the same as equation (6).

Figure 1:
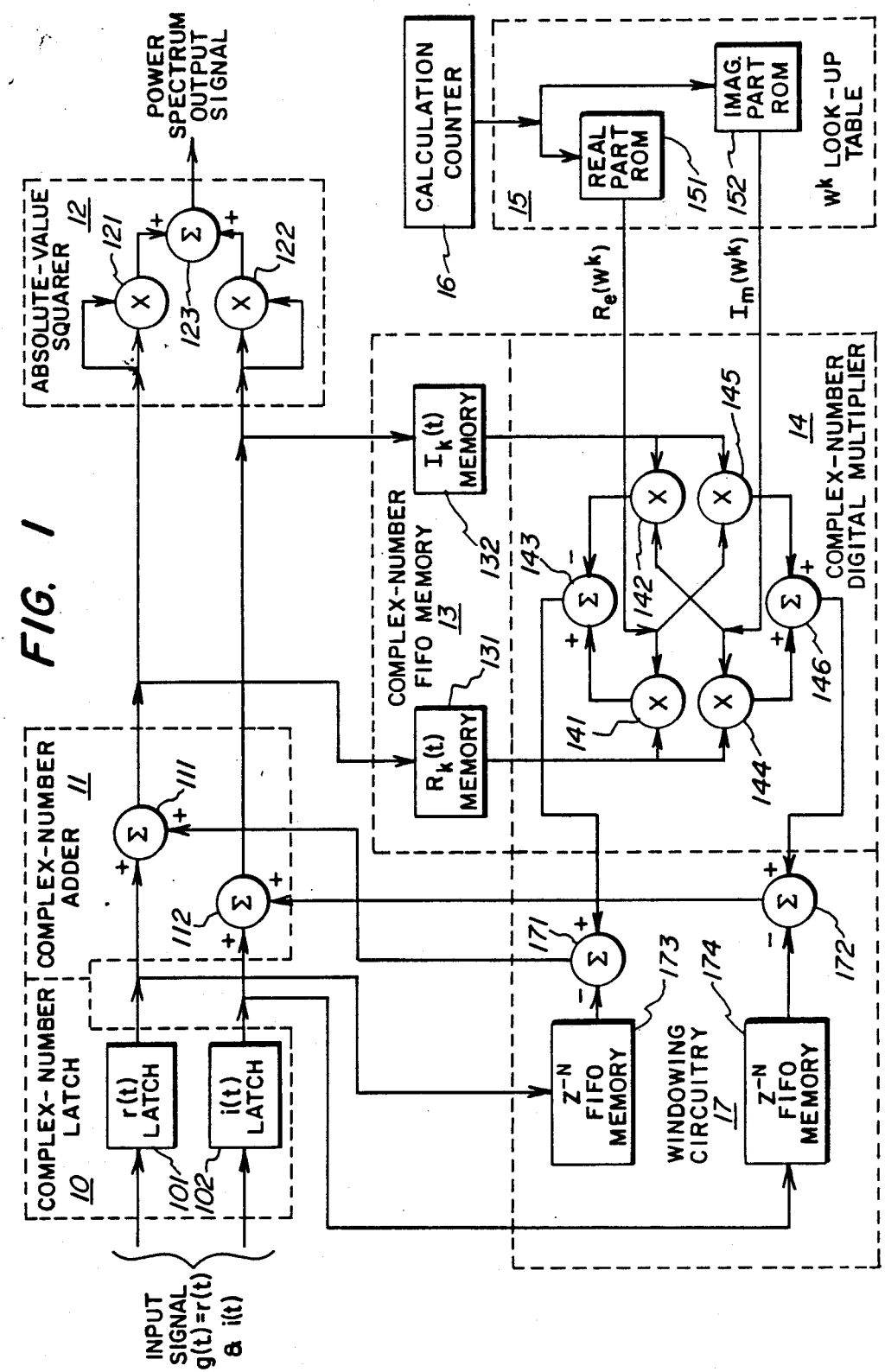
FIG. 1 is a schematic diagram of a power spectrum analyzer embodying the invention, which includes therein means for sequentially calculating a discrete Fourier transform using a rectangular truncation window.

FIG. 1 shows circuitry for carrying out the equation (5) computation. A complex-number latch 10 therein comprises a latch 101 for the real component of the complex number and a latch 102 for the imaginary component. A digital, sampled-data input signal g(t) has a real portion r(t) supplied to latch 101 and an imaginary portion i(t) supplied to latch 102. Latches 101 and 102 hold their respective portions of each successive sample of g(kt) input signal for a complete cycle of power spectrum calculations on that sample. If there are N power spectrum bins, the calculation cycle will involve N successive calculations, one for each power spectrum bin. N is normally a positive integral power of two—e.g., sixty-four.

A complex-number adder 11 comprises a two-input adder 111 for real portions of complex numbers and a two-input adder 112 for imaginary portions of complex numbers. The augends for adders 111 and 112 are supplied from latches 101 and 102, respectively. Adders 111 and 112 have a clock rate N times that of the input signal g(t) and the latches 101, 102. The addends for adders 111 and 112 during each calculation cycle are a set of N successive complex numbers, the derivation of which will be described later on in the specification.

The successive sums from complex-number adder 11 approximate the discrete Fourier transform $G_k(t)$ of g(t) and are forwarded to a squarer 12 of the absolute values of the transform terms. A complex power spectrum component of $G_k(t)$ is defined as the sums of the squares of the real $R_k(t)$ and imaginary $I_k(t)$ spectrum components. Accordingly, squarer 12 simply squares with a digital multiplier 121 the real portion of each sum as supplied from adder 111, squares with a digital multiplier 122 the imaginary portion of each sum as supplied from adder 112, and sums in an adder 123 the products supplied from digital multipliers 121 and 122. Adder 123 sum output signal in each cycle of computation specifies the N successive power spectrum bin values.

The successive sums from the complex-number adder 11 are also forwarded to an N-entry complex-number first-in/first-out memory 13. The complex-number FIFO memory 13 comprises a component N-entry FIFO memory 131 receptive of the real portion $R_k(t)$ of $G_k(t)$ as supplied from adder 111 sum output port and a component N-entry FIFO memory 132 receptive of the imaginary portion $I_k(t)$ of $G_k(t)$ as supplied from adder 112 sum output port. Complex-number FIFO memory 13 stores each Fourier transform component for use in the next computation cycle, performing the unit delay or $z^{-1}$ function for each $G_k(t)$ Fourier transform component.

The addends for complex-number adder 11 are generated by proceeding from the corresponding Fourier transform components for the previous computation cycle. Each Fourier transform component clocked out of complex-number FIFO memory is multiplied in a complex-number digital multiplier 14 by a successive one of the complex numbers $W^k$. The complex-number digital multiplier 14 comprises a component digital multiplier 141 for multiplying FIFO memory 131 output signal by the real portion $Re(W^k)$ of $W^k$, a component digital multiplier 142 for multiplying FIFO memory 132 output signal by the imaginary portion $Im(W^k)$ of $W^k$ and a subtractor 143 for subtracting the product of component digital multiplier 142 from the product of component digital multipliers 141 and 142 to obtain the real portion of the complex-product produced from complex-number digital multiplier 14. The complex-number digital multiplier further comprises a component digital multiplier 144 for multiplying FIFO memory 131 output signal by $Im(W^k)$, a component digital multiplier 145 for multiplying FIFO memory 132 output signal by $Re(W^k)$ and an adder 146 for summing the products from component digital multipliers 143 and 144 to obtain the imaginary portion of the complex product produced from complex-number digital multiplier 14.

A complex-number look-up table 15 supplies the successive complex values of $W^k$ for k equals zero through (N−1), which are used as multiplier signal by the complex digital multiplier 14. Look-up table 15 comprises a real-part read-only memory 151 and an imaginary-part read-only memory 152, each sequentially addressed by a calculation counter 16 having $\log_2 N$ stages. If N equals sixty-four, these N different complex values of $W^k$ are multiples of $W^1 = 0.99518 + j0.09802$ and are usually expressed in binary numbers. $W^1 = e^{-j2\pi/N}$ and $W^N = W^0 = 1$.

Apparatus 17 provides for in effect windowing the input signal samples with a rectangular truncation window by subtracting the g(t+1−N) term from complex-number digital multiplier 14 product in accordance with equation (5). A subtractor 171 receives as its minuend input signal the real portion of the complex product from complex-number digital multiplier 14 and supplies its difference output signal to adder 111 as its addend signal. A subtractor 172 receives as its minuend input signal the imaginary portion of the complex product from complex-number digital multiplier 14 and supplies its difference output signal to adder 112 as its addend signal. A first-in/first-out memory 173, read and written at input sample clock rate, delays for N sample periods the real portion of the complex input signal appearing at latch 101; and the delayed signal is applied to subtractor 171 as its subtrahend input signal. Another first-in/first-out memory 174, read and written at input sample clock rate delays the imaginary portion of the complex input signal appearing at latch 102 for N sample periods, to be applied to subtractor 172 as its subtrahend input signal.

FIG. 2 shows an equivalent circuit to that of the FIG. 1 power spectrum analyzer. The rearrangement places elements 171', 172', 173', 174' (which correspond roughly to elements 171, 172, 173, 174 in function) in positions which make their role in providing a rectangular truncation window filter 170 easier to discern.

One skilled in the digital filter design art may note that FIG. 2 can be modified so a complex digital multiplier 14' multiplies the complex sum from adder 11 by $W^k$ without the intervening delay afforded by FIFO memory 13, instead delaying the complex product in a complex-number FIFO memory 13' located after the multiplier 14'.

FIG. 3 shows this modification and further modification thus made possible. The differently located complex-number FIFO memory 13' permits 173' and 174' to be replaced by somewhat smaller FIFO memories 273 and 274 providing only (N−1)-sample delay of r(t) and i(t). FIFO memory 13', clocked at N times input sample rate and storing N successive samples of g(t) $W^k$ supplies the remaining one-sample delay of r(t) and i(t).

It is well known that the use of rectangular windows in the calculation of discrete Fourier transform does not provide satisfactory results in some applications because of ripple introduced into the Fourier transform by the sharp cut-off of the window filter (i.e., Gibb's phenomenon). Accordingly, a variety of alternative windows have been proposed which are symmetric in time, one of which is the triangular window defined as follows assuming N to be even.

$$\Delta(i) = i + 1 \quad \text{for } 0 \leq i < (N/2)$$
$$= (N - 1) - i \quad \text{for } (N/2) \leq i < N$$
$$= 0 \quad \text{otherwise.}$$

The triangular window is best conceived as being the convolution H'(i)*H'(i) where H' is the half-width rectangular window $$H'(i) = 1 \quad \text{for } 0 \leq i < (N/2)$$
$$= 0 \quad \text{otherwise.}$$

Now, by (3) the Fourier transform with triangular window is given by the following:

$$G(k,t) = \sum_{i=0}^{N-1} g(t - i)[H'(i)*H'(i)]W^{ik} \quad (11)$$

As with the rectangular window G(k,t) can be computed recursively as will now be shown. Passing to the z-domain the transfer function is, according to the definition of a filter in the z domain, $$\sum_{i=0}^{N-1} [H'(i)*H'(i)] \cdot (W^k z^{-1})^i = \left( \sum_{i=0}^{(N/2)-1} H'(i) \, (W^k z^{-1})^i \right)^2 \quad (12)$$

This last step is justified by the fact that discrete convolution may be interpreted as a polynominal product. Equation (12) has polynomials in ($W^k z^{-1}$).

Equation (12) may be written as equation (13) following, since $W^{N/2} = -1$.

$$\left( \sum_{i=0}^{N/2-1} (W^k z^{-1})^i \right)^2 = \left( \frac{1 - (W^k z^{-1})^{(N/2)}}{1 - W^k z^{-1}} \right)^2 \quad (13)$$

$$= \left( \frac{1 - (-1)^k z^{-(N/2)}}{1 - W^k z^{-1}} \right)^2 =$$

$$(1 - 2 (-1)^k z^{-(N/2)} + z^{-N}) (1 - W^k z^{-1})^{-1} (1 - W^k z^{-1})^{-1}$$

This shows that the required filter may be implemented as a cascade of filters with transfer functions corresponding to the three bracketed quantities in (13).

FIG. 4 shows such a cascade, the first filter 18 in the cascade being a transversal filter realizing the $[1-2(-1)^k z^{-(N/2)}+z^{-N}]$ system function at the input sample rate. Filter 18 is followed in cascade by recursive filters 19 and 20 each having a $[1/(1-W^k z^{-1}]$ transfer function, and being clocked at N times input sample rate.

In transversal filter 18, FIFO memories 180 and 181 provide a tapped delay line for r(t), delaying r(t) by (N/2) sample times at its center tap connected to a shifter 182 for multiplying by two and delaying r(t) by N sample times at its final tap connected to one input port of an adder 183. The other input port of adder 183, which invariably is operated as an adder, connects from the output port of an adder 184. Adder 184 responds to the least significant bit of calculation counter 16 count being a ZERO, to add shifter 182 output signal received at one of its output ports to r(t) received at the other of its output ports. Alternatively, adder 184 responds to the least significant bit of counter 16 count being a ONE, to subtract shifter 182 output signal from r(t). Adder 183 output signal is $i(t)[1-2(-1)^k z^{-(N/2)}+z^{-N}]$. Elements 185, 186, 187, 188 and 189 are analogous in their nature and operation to elements 180, 81, 182, 183 and 184, respectively. Accordingly, adder 188 output signal is $r(t)[1-2(-1)^k z^{-(N/2)}+z^{-N}]$.

Recursive filter 19 includes adder 191 and 192 together operative as a complex number adder for the complex input signal to filter 19 and for complex numbers that have been stored in a FIFO memory 193 for N cycles of a clock signal supplied at a rate N times input signal g(t) sample rate. The complex sum output from adders 191 and 192 is the complex output signal of filter 19, which is multiplied by successive values of $W^k$ for k=0 to (N−1) in a complex-number digital multiplier 194 to generate products used to update FIFO memory 193 contents.

Recursive filter 20 includes adders 201 and 202 together operative as a complex number adder for the complex input signal to filter 19 and for complex numbers that have been stored in a FIFO memory 203 for N cycles of a clock signal supplied at a rate N times input signal g(t) sample rate. The complex sum output from adders 201 and 202 is multiplied by successive values of $W^k$ for k=0 to (N−1) in a complex number digital multiplier 204, to generate filter 20 output signal, which is also used to update FIFO memory 203 controls.

One skilled in the art of digital filter design will understand that the cascaded recursive filters 19 and 20 have an overall transfer characteristic $(1-2W^k z^{-1}+W^{2k} z^{-2})^{-1}$ and that transfer characteristic can be achieved by a single recursive filter. Such a filter would add the response of the transversal filter 18, the previous response of filter 18 as multiplied by $-2W^k$ and the still earlier response of filter 18 as multiplied by $W^{2k}$. This requires that both $-2W^k$ and $W^{2k}$ values be calculated or stored in read-only memory, however. The FIG. 4b configuration is preferable in that only $W^k$ values have to be calculated or stored in read-only memory.

In preferred embodiments of the invention it is desirable to do away with the need for FIFO memories in developing the truncation window, so digital hardware requirements can be cut even further. To eliminate the need for these memories, the nature of the truncation window has to be changed. The truncation window should be one realizable by simple recursive filtering. With the notable exception of the rectangular truncation window, a special case since all kernel weights are zero or unity, symmetry of the filter kernel and finite impulse response are not generally attainable using recursive filtering. Some other exceptions such as the triangular truncation window can be found using special procedures. Generally, however, asymmetric (non-linear-phase) truncation windows are more readily realized if recursive filtering is to be done. The asymmetrical filter kernel when filtering in the time domain will have to have a Fourier transform that is symmetrical in the frequency domain, however.

The inventors propose a new window, the exponential window, defined where $\alpha$ is a positive constant greater than 1 as follows.

$$E(i) = \alpha^{-i} \text{ for } i \geq 0$$
$$= 0 \text{ otherwise}$$

From equation (3) the following equation (14), descriptive of the discrete Fourier transform using this window, is obtained.

$$G(k,t) = \sum_{i=\infty}^{\infty} g(t-i) \alpha^{-i} W^{ik} \quad (14)$$

To compute this recursively, consider the filter $G_k(t)$ which has a transfer function as follows in accordance with the definition of a filter in the z-transform domain.

$$\sum_{i=0}^{\infty} (\alpha^{-1} W^k z^{-1})^i = (1 - \alpha^{-1} W^k z^{-1})^{-1} \quad (15)$$

This shows, in accordance with the definition of the filter in the z-transform domain, that equation (14) may be written recursively as follows:

$$G(k,t) = g(t) + \alpha^{-1} W^k G(k,t-1). \quad (16)$$

Note that this window has an advantage over the rectangular and triangular windows in that previous values of the input do not need to be remembered.

The filter described by equations (15) and (16) has a single pole at $W^k \alpha^{-1}$. Assuming that $\alpha$ is close to 1, this is a filter which will enhance the $W^k$ frequency component of the input signal, having much the same effect as the filter associated with the rectangular window. Therefore, the Fourier transform with the exponential window may be expected to have similar properties to the DFT with a rectangular or triangular window.

FIG. 5 shows a modification of the FIG. 1 power spectrum analyzer wherein apparatus 17 with its FIFO memories 173, 174 is replaced. Instead of a rectangular truncation window as provided by apparatus 17 being used, an exponentially decaying truncation window as provided by apparatus 21 is used.

This is done by decrementing by the same fractional amount each of the real and imaginary components of the complex product supplied by complex digital multiplier 14. FIG. 5 shows this being done by simple shift-and-subtract technique in apparatus 21. This depends upon $\alpha^{-1}$ equaling $1-2^{-m}$, where m is a positive integer, which is a constraint more stringent than that encountered in the FIG. 7 power spectrum analyzer. The real portion of the complex product from digital multiplier 14 is applied as a minuend signal to a subtractor 211, and a fraction of this real portion (as can be calculated by a simple binary place shifter 212, as shown) is applied as a subtrahend signal to subtractor 211. The imaginary portion of the complex product from digital multiplier 14 is applied as a minuend signal to a subtractor 213, and a fraction of this imaginary portion (as can be calculated by a simple binary place shifter 214, as shown) is applied as a subtrahend signal to subtractor 213. The elimination of FIFO memories 173 and 174 in favor of binary place shifters 212 and 214 represents a substantial saving in digital hardware.

A number of variants of the FIGS. 1–5 apparatuses are possible, especially in regard to providing the roots $W^0, W^1, W^2, \ldots W^{(N-1)}$ for use by complex-number digital multiplier 14. Rather than using a look-up table 15 employing read-only memory, one Can calculate the N complex values of the Nth roots of unity by accumulation techniques.

FIG. 6 shows digital hardware for calculating $W^0, W^1, W^2, \ldots W^{(N-1)}$ by accumulation techniques to be supplied, for example, to complex-number multiplier 14. During the first step of calculation, a reset pulse is applied to multiplexers 21 and 222 to select a unit-valued number from a source 223 as $Re(W^0)$ and to select a zero-valued number from a source 224 as $Im(W^0)$. These values of $Re(W^0)$ and $Im(W^0)$ are applied to the real-component and imaginary-component multiplier input ports of complex-number digital multiplier 14, respectively, and to unit-delay latches 225 and 226, respectively. Latches 225 and 226 supply the real-component and imaginary-component multiplier input ports, respectively, of a complex-number digital multiplier 227. The real-component and imaginary-component multiplicand input ports of complex-number digital multiplier 227 respectively receive the real and imaginary portion of $W^1$ as supplied by sources 228 and 229, respectively. If N is 64, sources 228 and 229 supply binary numbers corresponding to decimal numbers 0.999518 and 0.09802, respectively, which are the amplitudes of the real and imaginary parts of $W^1 = e^{-j(2\pi/N)} = e^{-j(2\pi/64)}$.

During the second through $N^{th}$ steps of calculation, multiplexers 221 and 222 select the real and imaginary portions of complex-number digital multiplier 227 product as $\text{Re}(W^k)$ and $\text{Im}(W^k)$, respectively. Complex-number digital multiplier 227 raises the power of $W^k$ by one each step of calculation by multiplying by $W^1$ its former value as stored in latches 225 and 226. That is, during the second step of calculation, $W^0 = (1+j0)$ is multiplied by $W^1$ to yield $W^1$; during the third step of calculation $W^1$ is multiplied by $W^1$ to yield $W^2$; during the fourth step of calculation $W^2$ is multiplied by $W^1$ to yield $W^3$; etc.

In other modifications of the FIG. 1–5 apparatuses $W^k$ may be drawn from a look-up table 15' using read-only memory exploiting the symmetry of $W^0$ to $W^{[(N/2)-1]}$ and of $W^{(N/2)}$ to $W^{(N-1)}$ except as to the sign of $\text{Im}(W^k)$, thereby to permit read-only memory entries to be halved in number. In such case, the most significant bit of calculation counter 16 is used to selectively complement $\text{Im}(W^k)$ as drawn directly from read-only memory. Where $W^N$ equals an integral power of $W^4$, there will be quadrantal symmetry in $W^k$ values that can be taken advantage of to reduce the size of read-only memory; where $W^N$ equals an integral power of $W^8$, there will be octanal symmetry in $W^k$ values that can be taken advantage of; etc. Using a look-up table such as 15, rather than calculating successive values of $W^k$ by accumulation, is advantageous in that approximation errors do not accumulate.

It is pointed out that the multiplication and the windowing procedure, such as decrementing, are commutative mathematical operations. The delay in the complex FIFO memory 13 and multiplication in multiplier 14 are also commutative mathematical operations. These observations suggest a number of variants in the FIG. 5 apparatus.

FIG. 7 shows one such variation of the FIG. 5 power spectrum analyzer. If one assumes that the complex-number decrementer 22 in FIG. 5 decrements both the real and imaginary portion of the complex product from digital multiplier 14 to multiply them by a factor, then one can replace look-up table 15 with a look-up table 25 that stores values of $\alpha^{-1}W^k$, $k = 0, 1, \ldots (N-1)$. Read-only memory 251 stores real parts of $\alpha^{-1}W^k$ values, and read-only memory 252 stores imaginary parts of $\alpha^{-1}W^k$ values. The real and imaginary parts of the complex product from digital multiplier 14 are then applied directly as addends to adders 111 and 112, respectively. The need for separate decrementer hardware is advantageously avoided.

FIG. 8 shows a further variation on the FIG. 7 power spectrum analyzer exploiting the commutative nature of the mathematical procedures involved. The complex sum from adder is applied to digital multiplier 14' directly as multiplicand. The complex product from digital multiplier 14' is stored in a complex-number FIFO 13' to be delayed by N samples before being supplied as complex second addend signal to adder 11. Since both the real and imaginary parts of all $\alpha^{-1}W^k$ values are at least somewhat smaller than unity, the rearrangement of FIFO memory can save one bit in sample length when adders 111 and 112 operate over a full range from string-of-all-zeroes to one-followed-by-all-zeroes. FIG. 8 also serves as a basis for designing hardware when the delay in processing through a long-latency-time pipeline digital multiplier 14' subsumes an appreciable portion of all of the delay that must otherwise be provided by complex-number FIFO FIG. 9 power spectrum analyzer computes the elements of the power spectrum signal in parallel, rather than sequentially as in the FIG. 5 power spectrum analyzer. Elements of the analyzer are identified by call-out numbers similar to those of FIG. 5 followed by a hyphen and a suffix indicating the power spectrum bin number the element is used in the calculation of. That is, these suffixes identify the elements to a respective processor for calculating a respective power spectrum component.

The complex-number FIFO memory 13 used in FIG. 5 power spectrum analyzer to sequence the respective calculations for each power spectrum bin is replaced in each $X^{th}$ stage by a single-sample delay latch 26-X for the real portion of complex-number adder 11-X sum signal and a single-sample delay latch 27-X for the imaginary portion of complex-number adder 11-X sum signal, X taking on the successive values 1 through N in the call-out numbers of the respective stages for calculating the power spectrum components for power spectrum bins 1 through N.

The parallel computation of the power spectrum components reduces the clock rate of calculations to that of the sampled-data input g(t). This allows N-fold increase of the clock rate of the sampled-data input signal g(t) without having to increase the maximum clock rate of the digital hardware. This is at the cost of replicating most of the digital hardware. However, complex-number FIFO memory 13 is not replicated. Rather, it is replaced by data latches 26-1, ... 26-N, 27-1, ... 27N without any substantial increase in digital hardware. The cost in hardware for additional complex-number adders 11-2, ... 11-N is moderate. The complex-number digital multipliers 14-1, ... 14-N perform fixed-multiplier digital multiplications which reduces their complexity in hardware. Some of the multiplications are quite trivial since $\alpha^{-1}W^0 = \alpha^{-1}$, $\alpha^{-1}W^{(N/2)} = -\alpha^{-1} W^{(N/4)} = j\alpha^{-1}$ if N/4 be integral, and $\alpha^{-1} W^{(3N/4)} = -j\alpha^{-1}$ if N/4 be integral. A principal increase in hardware is the replication of the absolute-value squarer 12-1 in squarers 12-2, ... 12-N.

FIG. 10 is a representative way that FIG. 9 power spectrum analyzer also can be modified taking advantage of the commutative nature of the delay, multiplication and decrementation processes. Complex multipliers 14-1' through 14-N' use as multiplicands the undelayed sum signals from adders 11-1 through 11-N respectively. The real parts of the complex products are stored in latches 26-1' through 26-N', respectively, and the imaginary parts of the complex products are stored in latches 27-1' through 27-N', respectively, before their use in forming addends supplied to complex adders 11-1' through 11-N. Latches 26-1' through 26-N' and 27-1' through 27-N' may be subsumed in multipliers 14-1' through 14-N'.

The parallel computation of the discrete Fourier transform, as shown for the exponential window in FIGS. 9 and 10, can also be done for the rectangular and triangular truncation windows, in further embodiments of the invention.

As described in the book "The Fast Fourier Transform" by E. Oran Brigham, the action of windowing introduces distortions, often present as ripples in the DFT. This is caused by the fact that the DFT will be essentially equivalent to sampling the convolution of the Fourier transform of the input function and the Fourier transform of the window. In particular, a rectangular window has a sinc function as its Fourier transform, and the convolution of this sinc function with the Fourier transform of the incoming input signal will introduce ripples and broaden peaks, corresponding to the ripples in the sinc function and the width of its central peak. It is known to be impossible to meet both of the dual goals of reducing the side-lobes (ripples) and of narrowing the width of the peak using a window of a given maximum width. The exponential window, on the other hand, is not of finite width; and it is possible to narrow the central peak arbitrarily and reduce side lobes (actually, there are no ripples) by making the constant $\alpha$ close to 1. There are reasons, however, as will be seen, why this is not done without cost.

Consider now continuous Fourier transforms of continuous signals in a way that allows one to understand the properties of the discrete transforms of the sampled signals. In particular, the discrete transform may be obtained by wrapping the continuous transform around the unit circle (aliasing) and sampling the result. The Fourier transform of the exponential window appears in equation (16) previously derived. FIGS. 11, 12 and 13 respectively graph $(\beta^2+\omega^2)-0.5$, the amplitude of this transform; $\beta/(\beta^2+\omega^2)$, the amplitude of its real portion, and $\omega/(\beta^2+\omega^2)$, the amplitude of its imaginary portion. Here $\beta=\log 2^\alpha$ and $\omega$ is radian frequency. As $\beta$ decreases, the response peaks narrow—that is, become sharper. Now suppose that the input function is periodic, and hence that its continuous Fourier transform consists of a sequence of impulse functions. The convolution of this frequency domain function with the Fourier transform of the window replaces each of the impulse peaks with the peaks shown in FIG. 11. For sufficiently small $\beta$, this gives a good approximation to the continuous transform.

It might seem that the choice of a very small value for $\beta$ will be best since it gives a transform with very narrow peaks. Furthermore, such a choice of window will do a good job of filtering out noise in the signal and cause the frequency domain function to respond more slowly to transients or noise in the time domain signal.

However, there are two disadvantages to this. First, it may be important to have quick response to transients, in speech analysis, for instance. Secondly, it may be possible to lose valid periodic signals by making the width of the window transform peak narrower than the frequency-domain resolution. For instance, if the input signal consists of a single sinusoid at a frequency midway between two bins in the frequency domain, then making the decay constant too small will cause the spike caused by the sinusoid to disappear between two bins and not be seen. As a general rule, when viewing signals with significant periodic content, the factor should be chosen so that the width of the peak in the window spectrum should equal about one bin at half power.

To avoid spectral peaks disappearing between two bins, it is possible to increase the number of bins, thereby increasing the resolution. To do this, all that is needed in the case of the exponential window is to change the value of W and to increase the number of bins computed. No change to the window is necessary, though a decrease in the rate of exponential decay may accompany the increase in the number of bins computed, in order to take advantage of the extra resolution. The number of entries that the complex number FIFO memory 13 and 13' can store has to go up commensurately with the number of bins that are computed, and eventually there is not enough time available to make extra computations. To overcome the problems of increased FIFO memory size and time for completing calculations, it is still possible to "zoom in" to a particular part of the frequency spectrum which may be of interest, increasing the resolution in this specific area without increasing the number of bins or the rate of computation. This will be considered later.

In the case of the rectangular and triangular windows it is still possible to increase the resolution in the frequency domain, though not as easily. A standard method of doing this is to pad the input set with zero values, or nulls. This does not work properly in the context of recursive computation of the transform used here. The key remark to make here is that we have made minimal use of the fact that the $W^k$ values are Nth roots of unity, or are powers of the same value, W. Now, let us drop this requirement and write $W_k$ instead of $W^k$. The values $W_k$ are assumed only to be some values indexed by k. Neither is it necessary to assume that there are N of them. It will be assumed that the indices k range from 1 to M. We then obtain slightly modified equations for the recursive computation of the transforms. We obtain:

For the rectangular window:

$$G(k,t+1)=W_k G(k,t)+g(t+1)-W_k^N g(t+1-N) \quad (17)$$

For the triangular window:

$$G(k,t+1)=W^k(G(k,t)+G'(k,t)) \quad (18)$$

$$G'(k,t+1)=W_k G'(k,t)+g(t+1)-2W_k^{(N/2)}g[(t+1-N/2)]+W_k^N g(t+1-N) \quad (19)$$

For the exponential window:

$$G(k,t+1)=W_k a^{-1}G(k,t)+g(t+1) \quad (20)$$

The circuits previously described may be modified to take account of the additional factors $W^N$ and $W^{(N/2)}$ which appear in these equations. These modifications include extension of FIFO memory 13, 13-1, 13-2, 193, 203 capabilities and more complex $W^k$ generating circuitry.

In order to justify this operation, the meaning of the new transforms must be considered. This will be done for the rectangular and exponential windows only.

As was pointed out previously, the rectangular window case is equivalent to a set of FIR filters of the form $$G_k(t) = \sum_{i=0}^{N-1} g(t-i)W_k^i \quad (21)$$

with transfer equation equal to $$\frac{1-(W_k z^{-1})^N}{1-W_k z^{-1}} \quad (22)$$

This is a filter with zeros at $W_k e^{ji2\pi/N}$ for $i=1 \ldots (N-1)$ (but no $i=0$). (The imaginary unit is represented by j.) In the case of most interest, $W_k$ lies on the unit circle, and so just as in the previous case, this is a filter which passes the frequency $W_k$ and attenuates other frequencies. Once again, the frequency response of this filter is a sinc function centered at $W_k$. If the values of $W_k$ are chosen as M evenly spaced values in some restricted interval of interest on the unit circle, then the resulting transform gives a zoom of the Fourier transform with increased resolution, showing frequencies in the interval of interest only.

Unfortunately, zooming beyond a certain point is non-productive, because of the limited selectivity of the individual FIR filters. For instance, if the input signal is a pure sinusoid, then zooming in on the frequency of the input signal will just give a more and more precise resolution to the sinc-shaped response produced by the finite length window. The only way to improve this and make a more selective filter is to increase the width of the window (N). This means increasing the number of previous values of the input signal stored and changing the hardware accordingly.

In the case of the exponential window, the filters are IIR filters, with transfer characteristic equal to $1/(1-W_k\alpha^{-1}z^{-1})$. This has a single pole at $W_k\alpha^{-1}$. Once again, assuming that $W_k$ is on the unit circle and $\alpha$ is close to it, this gives a frequency response as shown in FIG. 12. Choosing M evenly spaced values of $W^k$ in a restricted region of the unit circle leads to an increase in resolution in the frequency domain. By simultaneously varying the value of $\alpha$ it is possible to take advantage of the increased resolution to sharpen the selectivity of the individual filters and reduce the effect of windowing.

Zooming is readily accommodated in the FIG. 7 and FIG. 8 circuits by changing the values in the $W^k$ look-up table 25 so $\alpha^{-1}$ provides the desired selectivity in the transform. This can be done, for example, by realizing read-only memories 251 and 252 using random access memories so they may be readily updated. The RAM memories 251 and 252 will store the real and imaginary parts of $\alpha^{-1}W_k$ for $k=0\ldots M-1$. Normally the bins will be evenly spaced, so that $\alpha^{-1}W_k = \alpha^{-1}W_oU^k$ where U is the angular distance between bins. Note that this zooming feature may also be implemented in the method used in FIG. 6, by storing $W_o$ in registers 223 and 224 and U in registers 228 and 229. These registers should be implemented in RAM to allow variable degree of zooming.

One skilled in the art and armed with the foregoing disclosure will be enabled to design other embodiments of the invention, and this should be borne in mind in construing the claims which follow. Claims should be construed broadly enough to include certain well-known equivalents within their scope. For example, absolute-value squares 12, 12-1, . . . 12-N may each be replaced by a look-up table in read-only memory. Complex multipliers 14, 14', 14'', 14-1', 14-N', 14-'', . . . 14-N'' may each be realized using read-only memory. Read-only memory for replacing complex multipliers 14, 14' or 14'' may be addressed using calculation counter 16 and complex adders 11 output signals. The adders 111, 112 and the subtractors 181, 182 in FIG. 8 perform operations that are commutative and can be done in different order in equivalent circuitry.

One skilled in the art and acquainted with the foregoing disclosure will be enabled to design a variety of apparatus for calculating discrete Fourier transform spectral components, besides those preferred embodiments specifically described, and this should be borne in mind when construing the scope of the claims which follow, which are intended to include such design variations within their scope.

For example, the electronic adders commonly used in digital electronics are capable of performing signed additions and can be arranged for actually performing subtractions.

What is claimed is:

1. Electrical apparatus for continuously computing on a recursive basis a sampled-data electric signal descriptive of the electric power of a spectral component of the discrete Fourier transform of a sampled-data electric input signal, said electrical apparatus comprising:

means comprising at least one electronic adder for combining each successive sample of said sampled-data electric input signal with a successive complex-number sample of another sampled-data electric signal to generate a successive complex-number sample of said spectral component of the discrete Fourier transform in electric signal form;

a complex-number multiplier for generating in electric signal form the product of the just previous complex-number sample of of said spectral component of the discrete Fourier transform multiplied by a prescribed factor, to be included in said complex-number sample of another sampled-data electric signal; and electronic squaring apparatus for squaring the absolute value of each said sample of of said spectral component of the discrete Fourier transform, thereby to determine the sampled-data electric output signal descriptive of the sampled-data electric power thereof.

2. Electrical apparatus for continuously computing on a recursive basis a sampled-data electric output signal descriptive of an integral number N of spectral components of the discrete Fourier transform of a sampled-data electric input signal, N being at least two, wherein a rectangular truncation window is used, said electrical apparatus comprising:

means for combining each successive sample of said sampled-data electric input signal with N successive complex-number samples of another sampled-data electric signal to generate N successive complex-number samples of said sampled-data electric output signal descriptive of N respective spectral components of the discrete Fourier transform;

a single complex-number multiplier for generating the product of the just previous sample of said sampled-data electric output signal descriptive of a spectral component of the discrete Fourier transform, as multiplied by a root of unity associated with that spectral component, to be included in the Nth next sample of said another sampled-data electric signal; and electronic circuitry for multiplying each successive sample of said sampled-data electric input signal by minus one and delaying the result to also be included in the N of said complex-number, samples of another signal that are combined with a next sample of said sampled-data electric input signal by said means for combining, in which said electrical apparatus each said means is constituted of electronic circuitry and each said sample is manifested in electric signal form.

3. Apparatus for continuously computing on a recursive basis an integral number N of the spectral components of the discrete Fourier transform of a sampled-data electric input signal, N being at least two, said apparatus comprising:

means for combining each successive sample of said sampled-data electric input signal with N successive complex-number samples of each of said N spectral components of the discrete Fourier transform;

means for generating on a time-division-multiplex basis the complex-number products of the successively generated samples of each said spectral component of the discrete Fourier transform as multiplied by respective prescribed factors, to be included in a next sample of said another signal, each said prescribed factor being a different $N^{th}$ root of unity;

a complex-number subtractor, included within said means for combining, said subtractor having a minuend input port receptive of the product of the just previous sample of said spectral component of the discrete Fourier transform multiplied by said prescribed factor, a subtrahend input port, and a difference output port;

means for multiplying each successive sample of said sampled-data electric input by minus one;

means for delaying each resulting successive sample of said sampled-data electric input signal as multiplied by minus one, for the duration of N samples of said another signal to the subtrahend input port of said subtrahend; and a complex-number adder included within said means for combining said adder, having an augend input port receptive of said input signal, an addend input port connected from the difference output port of said subtractor to receive said other signal and a sum output port for supplying each successive sample of said spectral component of the discrete Fourier transform, in which said apparatus each said means is constituted of electronic circuitry and each said sample is manifested in electric signal form.

4. Apparatus for continuously computing on a recursive basis an integral number N of the spectral components of the discrete Fourier transform of a sampled-data electric input signal, N being at least two, said apparatus comprising:

means for combining each successive sample of said sampled-data electric input signal with N successive complex-number samples of another signal to generate successively complex-number samples of each of said N spectral components of the discrete Fourier transform;

means for generating on a time-division-multiplex basis the complex-number products of the successively generated samples of each said spectral component of the discrete Fourier transform as multiplied by respective prescribed factors, to be included in a next sample of said another signal, each said prescribed factor being a different $N^{th}$ root of unity;

a complex-number adder included within said means for combining, said adder having an augend input port, an addend input port receptive of a portion of said other signal that consists of said product of the just previous sample of a said spectral component of the discrete Fourier transform multiplied by said prescribed factor, and a sum output port for supplying each successive sample of a said spectral component of the discrete Fourier transform;

a complex-number subtractor having a minuend input port receptive of said input signal, a subtrahend input port receptive of a further portion of said other signal, and a difference output port connected to the augend input port of said adder;

means for delaying said sampled-data electric signal for the duration of N samples of said another signal before application of said sampled-data electric input signal to the subtrahend input port of said subtractor; and means for supplying the resulting delayed sampled-data electric signal to the subtrahend input port of said subtractor as said further portion of said other signal, in which said apparatus each said means is constituted of electronic circuitry and each said sample is manifested in electric signal form.

5. Electrical apparatus for continuously computing on a recursive basis a sampled-data electric output signal descriptive of a spectral component of the discrete Fourier transform of a sampled-data electric input signal, said electrical apparatus comprising:

means comprising at least one electronic adder for combining each successive sample of said sampled-data electric input signal with a successive complex-number sample of another sampled-data electric signal to generate a successive complex-number sample of said spectral component of the discrete Fourier transform;

a complex-number multiplier for generating in electric signal form the complex-number product of the just previous complex-number sample of said spectral component of the discrete Fourier transform as multiplied by a prescribed factor, said prescribed factor being a fraction of a root of unity, which fraction is less than one; and means for applying said complex-number product to said means for combining, as said successive complex-number sample of another sampled-data electric signal, wherein an exponential window is provided for the computing of said spectral component of the discrete Fourier transform, in which said electrical apparatus each said means is constituted of electronic circuitry and each said sample is manifested in electric signal form.

6. Apparatus for continuously computing on a recursive basis a spectral component of the discrete Fourier transform of a sampled-data electric input signal, using a triangular truncation window, said apparatus comprising:

a recursive filter having a transfer function $(1-2W^k z^{-1} + W^{2k} z^{-2})$ where $W^k$ is a root of unity, and a transversal filter, said filters having respective input and output ports, and being in cascade connection with each other for receiving said electric input signal and for supplying in response said spectral component of the discrete Fourier transform of that electric input signal;

means included within said transversal filter for delaying samples received at its input port for a number N of sample times, where N is a positive even integer;

means included within said transversal filter for providing doubles of samples as received at its input port and delayed (N/2) sample times; and means included within said transversal filter for linearly combining the samples received at its input port, the samples received at its input port and delayed a number N of sample times, and said doubles of samples received at its input port and delayed (N/2) sample times.

7. Apparatus for continuously computing on a recursive basis a spectral component of the discrete Fourier transform of a sampled-data electric input signal, using a triangular truncation window, said apparatus comprising:
   a transversal filter,
   a first recursive filter, and
   a second recursive filter, having respective input and output ports, and being in cascade connection with each other for receiving said electric input signal and for supplying in response said spectral component of the discrete Fourier transform of that electric input signal;
   means included within said transversal filter for delaying samples received at its input port for a number N of sample times, where N is a positive even integer;
   means included within said transversal filter for providing doubles of samples as received at its input port and delayed (N/2) sample times;
   means included within said transversal filter for linearly combining the samples received at its input port, the samples received at its input port and delayed a number N of sample times, and said doubles of samples received at its input port and delayed (N/2) sample times;
   a first adder included within said first recursive filter having an augend input port connected from the input port of said first recursive filter, having an addend input port, and having a sum output port connected to the output port of said first recursive filter;
   means included within said first recursive filter for generating, for application to the addend input port of said first adder, the product of a just previous sample at the sum output port of said first adder with a prescribed factor that is a root of unity, which means includes a first multiplier;
   a second adder included within said second recursive filter having an augend input port connected from the input port of said second recursive filter, having an addend input port, and having a sum output port connected to the output port of said second recursive filter; and
   means included within said second recursive filter for generating, for application to the addend input port of said second adder, the product of a first previous sample at the sum output port of said second adder with said prescribed factor, which means includes a second multiplier.

8. Apparatus as set forth in claim 7 wherein the output port of said first recursive filter directly connects to the input port of said second recursive filter in said cascade connection.

9. Apparatus as set forth in claim 7 wherein said transversal filter precedes said second recursive filter in said cascade connection.

10. Apparatus as set forth in claim 7 wherein said transversal filter precedes both said first and second recursive filters in said cascade connection.

11. Apparatus as set forth in claim 7 wherein said means for providing doubles of samples as received at its input port and delayed (N/2) sample times is of a type delaying samples received at its input port and then doubling the delayed samples.

12. Apparatus for continuously computing on a recursive basis samples of a complex spectral component of the discrete Fourier transform of a sampled-data input signal wherein an exponential window is used, said apparatus comprising:
   a complex-number adder having an augend input port for receiving said input signal, having an addend input port for receiving samples of a complex other signal, and having a sum output port for delivering samples of said complex spectral component of the discrete Fourier transform;
   means for generating the complex product of the just previous sample from said sum output port with (1-d) times a root of unity, where d is a positive fraction of one; and
   means for applying each successive sample of said complex product so generated to the addend input port of said adder as said complex other signal, in which said apparatus each said means is constituted of electronic circuitry and each said sample is manifested in electric signal form.

13. Electrical apparatus for continuously computing k sampled-data electric output signals descriptive of respective spectral components of the discrete Fourier transform of a sampled-data electric input signal, said k spectral components having respective consecutive ordinal numbers selected from the consecutive ordinal numbers zeroth through $(N-1)^{th}$, N being a positive integer at least two, said electrical apparatus comprising:
   a data latch for latching each successive sample of said sampled-data electric input signal for the period of k successive calculation steps:
   means, comprising at least one electronic adder, for additively combining with said latched successive sample of said sampled-data electric input signal, during each of said k successive calculation steps, a respective complex-number sample of an additive sampled-data electric signal, thereby to generate a sample of a correspondingly numbered sampled-data electric sum signal; and
   electronic circuitry for generating a current sample of the complex-number product of each succeeding one of the previous samples of the correspondingly numbered sampled-data electric sum signal as multiplied by at least a fraction of the quantity $e^{-j2pk/N}$, said current samples of the product being supplied to said means for additively combining as a further input signal thereto, k being the ordinal of the calculation step.

14. Electrical apparatus as set forth in claim 13, using a rectangular truncation window, wherein each said numbered sampled-data electric sum signal is a respective one of said k spectral components, wherein said electronic circuitry for generating a current sample of the product consists of electronic circuitry for a current sample of the product of the previous correspondingly numbered spectral component as multiplied by essentially the entire quantity $e^{-j2pj/N}$, and wherein there is included:
   means for using, as a current sample of a subtractive sampled-data electric signal, the $(N-1)^{th}$ previous sample of said sampled-data electric input signal, said current samples of said subtractive sampled-data electric signal being supplied as a still further input signal to said means for additively combining.

15. Electrical apparatus as set forth in claim 13, using an exponential window, wherein said electronic circuitry for generating a current sample of the product consists of means for generating a current sample of the product of the previous correspondingly numbered spectral component as multiplied by a fraction less than one of the quantity $e^{-j2pk/N}$, wherein each said numbered sampled-data electric sum signal is a respective one of said k spectral components, and wherein said sampled-data electric input signal and said additive sampled-data electric signal are essentially the only input signals to said means for additively combining.

16. Apparatus for continuously computing k spectral components of the discrete Fourier transform of a sampled-data electric input signal having respective consecutive ordinal numbers elected from the set of consecutive ordinal numbers zeroeth through $(N-1)^{th}$, N being a positive even integer at least two, said apparatus using a triangular window and comprising:
  means for latching each successive sample of said sampled-data electric input signal for the period of k successive calculation steps;
  a transversal filter, having an input port connected from said means for latching, and having an output port;
  means included in said transversal filter for adding each sample of said electric input signal to the $(N-1)^{th}$ previous sample of said electric input signal and to $2(-1)^k$ times the $[(N/2)-1]^{th}$ previous samples of electric input signal, thereby to generate response at the output port of said transversal filter; and
  a recursive filter having an input port connected from the output port of said transversal filter, having an output port for supplying said k spectral components, and exhibiting a transfer function between its input and output ports of $(1-2W^k z^{-1}+W^{2k} z^{-2})^{-1}$ for each of said k spectral components where W is the quantity $e^{-j2\pi/N}$.

17. Apparatus for continuously computing k spectral components of the discrete Fourier transform of a sampled-data electric input signal having respective consecutive ordinal numbers selected from the set of consecutive ordinal numbers zeroeth through $(N-1)^{th}$, N being a positive even integer at least two, said apparatus using a triangular window and comprising:
  means for latching each successive sample of said sampled-data electric input signal for the period of k successive calculation steps;
  a transversal filter, having an input port connected from said means for latching, and having an output port;
  means included in said transversal filter for adding each sample of said electric input signal to the $(N-1)^{th}$ previous sample of said electric input signal and to $2(-1)^k$ times the $[(N/2)-1]^{th}$ previous sample of electric input signal, thereby to generate response at the output port of said transversal filter;
  a cascade connection of first and second recursive filters after said transversal filter, each of said recursive filters having a respective input port and a respective output port, said k spectral components being supplied at the output port of the later recursive filter in said cascade connection of first and second recursive filters;
  first and second complex-number adders respectively included in said first and said second recursive filters, each of said first and second complex-number adders having an augend input port connected from the input port of the recursive filter in which that complex number adder is included, having an addend input port and having a sum output port;
  first and second complex-number multipliers respectively included in said first and second recursive filters and arranged for multiplying the previous output samples at the sum output ports of said first and second complex-number adders by the factor $e^{-j2\pi k/N}$ to generate the current samples at their addend input ports, k being the ordinal number of the calculation step, the output port of said first complex-number adder connecting to the output port of said first recursive filter, and the output port of said second complex-number multiplier connecting to the output port of said second recursive filter.

18. Electrical apparatus for continuously computing on a recursive basis a sampled-data electric output signal descriptive of the electric power of a spectral component of the discrete Fourier transform of a sampled-data electric input signal, said electric apparatus comprising:
  means comprising at least one electronic adder for combining each successive sample of said sampled-data electric input signal with a successive complex-number sample of another sampled-data electric signal to generate a successive complex-number sample of said ordinal component of the discrete Fourier transform in electric signal form;
  a complex-number multiplier for generating in electric signal form the product of the just previous complex-number sample of of said spectral component of the discrete Fourier transform multiplied by a prescribed factor, to be included in said complex-number sample of another sampled-data electric signal; and
  electronic squaring apparatus for squaring the absolute value of each said sample of of said spectral component of the discrete Fourier transform, thereby to determine the sampled-data electric output signal descriptive of the sampled-data electric power thereof, wherein said electronic squaring apparatus for squaring the absolute value of each said sample of of said spectral component of the discrete Fourier transform comprises:
  means for squaring the real portion of each successive complex-number sample of said spectral component of the discrete Fourier transform;
  means for squaring the imaginary portion of each successive complex-number sample of said spectral component of the discrete Fourier transform; and
  a further electronic adder for summing the squares of the real and imaginary portions of each successive complex-number sample of said spectral component of the discrete Fourier transform, thereby to determine the sampled-data electric power of said spectral component of the discrete Fourier transform.

* * * * *